(12) United States Patent
Shimizu et al.

(10) Patent No.: US 6,888,600 B2
(45) Date of Patent: May 3, 2005

(54) DISPLAY PANEL FOR A DISPLAY DEVICE (75) Inventors: Hidehisa Shimizu, Sagamihara (JP); Kaoru Kusafuka, Kawasaki (JP); Mitsuru Ikezaki, Sagamihara (JP); Asao Terukina, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 268 days.

(21) Appl. No.: 09/682,374

(22) Filed: Aug. 27, 2001

(65) Prior Publication Data

US 2002/0027538 A1 Mar. 7, 2002

(30) Foreign Application Priority Data

Sep. 6, 2000 (JP) ....................................... 2000-270143

(51) Int. Cl.⁷ .......................................... G02F 1/1343
(52) U.S. Cl. ...................................... 349/141; 349/139
(58) Field of Search .......................... 349/141, 38, 39, 349/139, 143

(56) References Cited

U.S. PATENT DOCUMENTS

| | | | |
|---|---|---|---|
| 5,946,066 A | | 8/1999 | Lee et al. |
| 6,177,970 B1 | * | 1/2001 | Kim ............................. 349/43 |
| 6,335,770 B1 | * | 1/2002 | Komatsu ...................... 349/38 |
| 6,337,726 B1 | * | 1/2002 | Kawano et al. ............. 349/141 |
| 6,552,770 B2 | * | 4/2003 | Yanagawa et al. .......... 349/155 |

FOREIGN PATENT DOCUMENTS

JP     2000-056324     2/2000

\* cited by examiner

*Primary Examiner*—Kenneth Parker
*Assistant Examiner*—David Chung
(74) *Attorney, Agent, or Firm*—Derek S. Jennings; David Aker (57) ABSTRACT

In each pixel region of a liquid crystal panel of an in plane switching mode, a pixel electrode is made to have a two-layer structure composed of a lower pixel electrode located in the same layer as a signal line and of an upper pixel electrode located in the same layer as a common electrode. Moreover, an electrode portion of the lower pixel electrode is made closer to the signal line than the upper pixel electrode. Furthermore, the signal line, a gate line and the common electrode are arranged in an overlapped manner.

20 Claims, 10 Drawing Sheets

DISPLAY PANEL FOR A DISPLAY DEVICE

BACKGROUND OF THE INVENTION

The present invention relates to a display panel and a display device, in which an optical display element such as liquid crystal is driven by in plane switching in a direction along a substrate surface.

There has been a remarkable progress in the popularization of a liquid crystal display device used as a display device for a personal computer, or other various monitors. The liquid crystal display device of this kind is typically constituted in a manner that a backlight as a planar light source for illumination is provided in the backside of a liquid crystal panel, a liquid crystal surface having a predetermined area is irradiated to have an entirely uniform brightness, and thus an image formed on the liquid crystal surface of the liquid crystal panel is made visible. The liquid crystal panel is constructed in a way that a drive voltage is applied to the liquid crystal filled between two glass substrates to drive the liquid crystal. In the liquid crystal panel, the liquid crystal is driven to change an orientation of the liquid crystal (molecule) in the above-described manner. Therefore, polarization of transmitted light is controlled, and thus a desired image is displayed.

Incidentally, in the liquid crystal panel is made so that the electrodes for driving the liquid crystal have been provided on one and the other of two glass substrates, respectively, and an electric field has been generated in a direction of the two glass substrates being linked to each other, that is, in a direction approximately perpendicular to the substrate surfaces of the glass substrates, and thus the liquid crystal is driven.

However, in the liquid crystal panel of the system as described above, the viewing angle thereof has been narrow. A technology for improving the viewing angle, an in plane switching (IPS: a transverse electric field) mode is known. This is a technology, in which a drive voltage is applied to the electrodes provided in only one of the two glass substrates. An electric field in a horizontal direction (transverse direction) along the substrate surface is generated, and thus the liquid crystal is driven.

Figure 7:
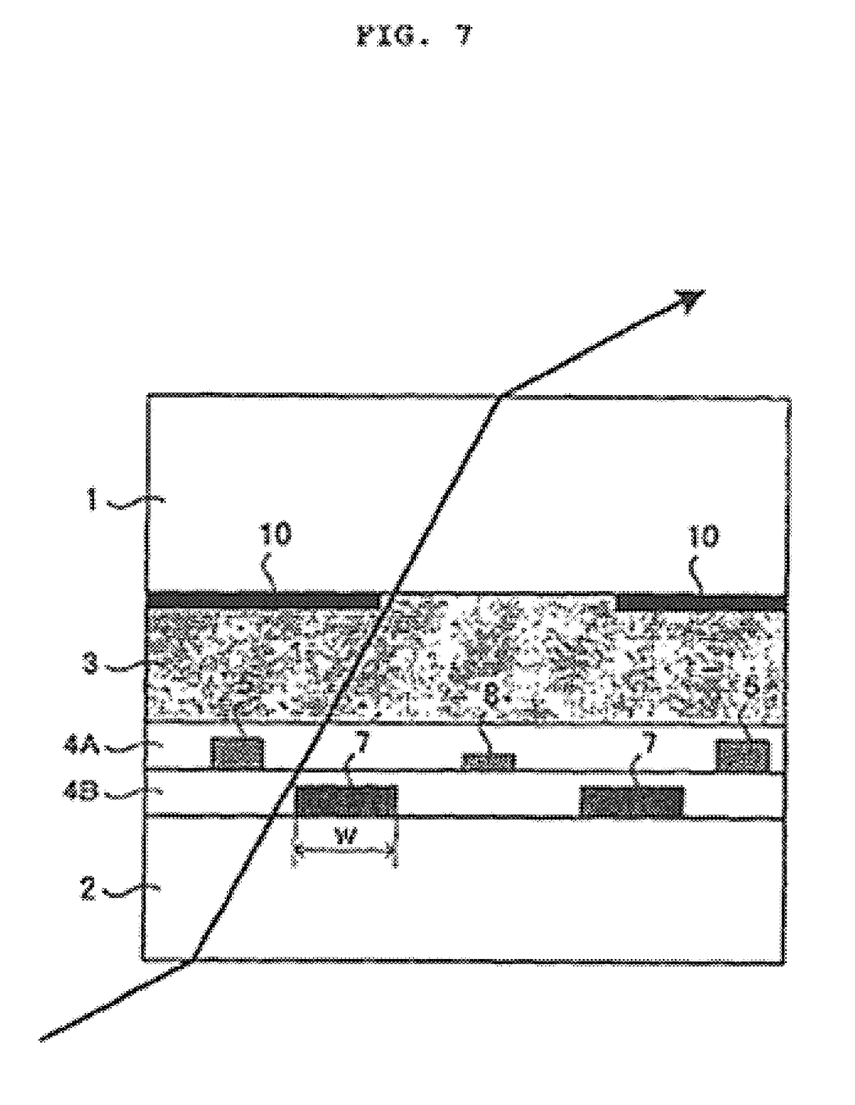
FIG. 7 is a cross-sectional view of a conventional display panel.
Figure 8:
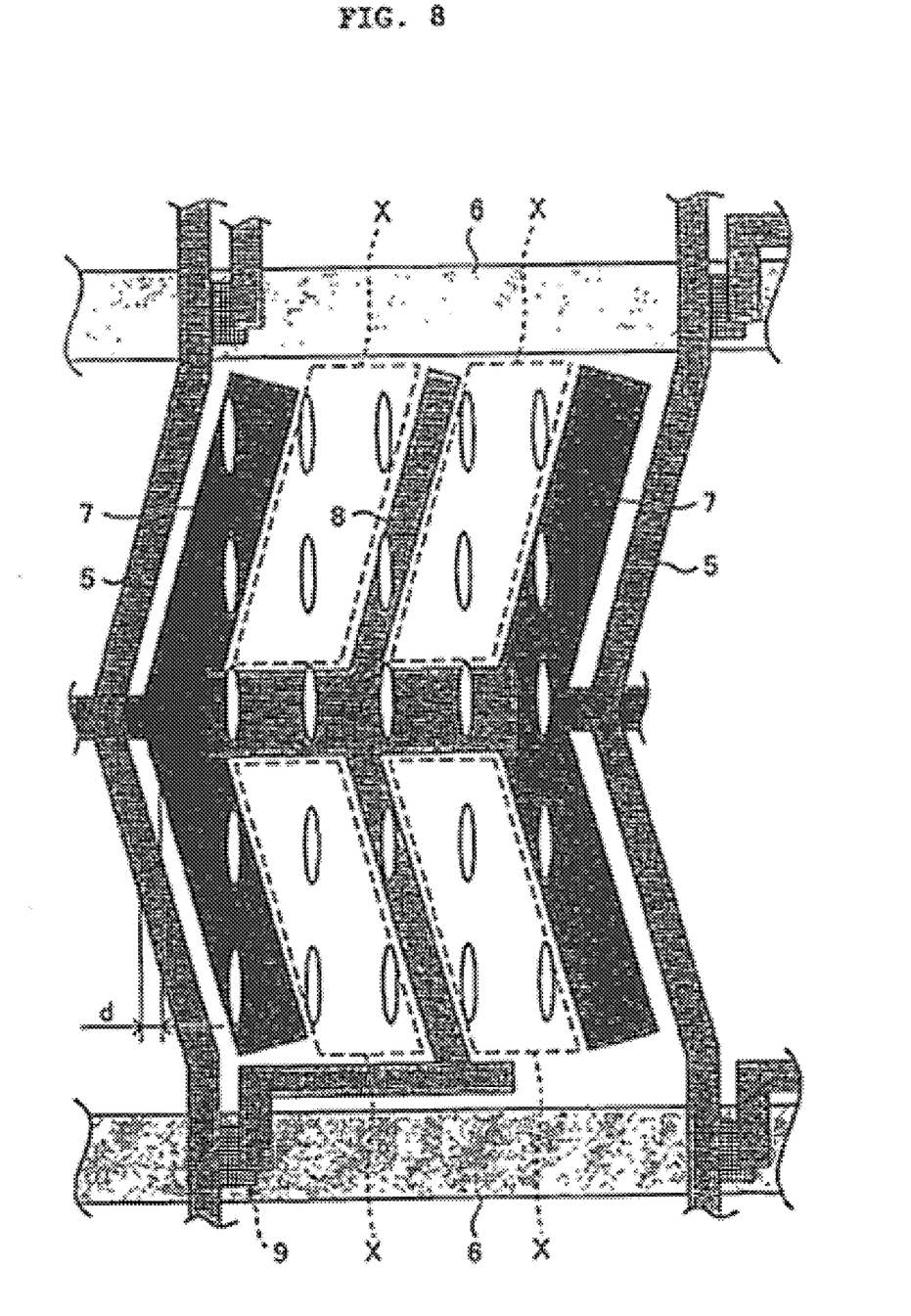
FIG. 8 is a plan view showing a wiring structure of the conventional display panel.

FIGS. 7 and 8 show a wiring structure of a liquid crystal panel of the conventional IPS mode. The liquid crystal panel is constructed in such a manner that a liquid crystal layer 3 filled with liquid crystal, insulating layers 4A and 4B are interpolated between glass substrates 1 and 2, and that insulating layers 4A and 4B are provided with thin film transistors (TFTs) 9 having signal lines 5, gate lines 6, common electrodes 7, pixel electrodes 8, an amorphous silicon layer and the like deposited thereon.

As shown in FIG. 8, the signal lines 5 and the gate lines 6 are arranged in a matrix type. Then, a pixel region is defined by two signal lines 5 adjacent to each other and two gate lines 6 adjacent to each other surrounding the same.

The common electrode 7 is arranged along each of the signal lines 5 located at the both sides of each pixel region. Moreover, the pixel electrode 8 is arranged in an intermediate position between two common electrodes 7, and one end of the pixel electrode 8 is connected to the TFT 9.

With regard to the liquid crystal panel thus structured, in each pixel region, a voltage is applied between the common electrode 7 and the pixel electrode 8 by an operation of the TFT 9, a transverse electric field is generated, and thus the liquid crystal is driven to perform a desired displaying.

Incidentally, in the liquid crystal panel of the conventional IPS mode as described above, there exist problems as described below.

First, the drive of the liquid crystal is originally performed by an electric field between the common electrode 7 and the pixel electrode 8. However, if an electric field is generated between the signal line 5 and the pixel electrode 8 and the liquid crystal is moved by the influence thereof, crosstalk occurs. For this reason, heretofore, by widening the width of the common electrode 7, the common electrode 7 is set to exert the shield effect so as not to extend the influence of the electric field from the signal line 5 to the pixel electrode 8. However, this results in lowering of an aperture ratio as a ratio of an aperture X to the pixel region.

Moreover, when a distance d between the signal line 5 and the common electrode 7 is small, an electric capacitance load to the signal line 5 is increased thereby not allowing the liquid crystal in the display region to be driven evenly. Therefore, the distance d is required to be enlarged. However, such enlargement of the distance d also results in lowering of the aperture ratio. Furthermore, in order to prevent crosstalk dependent on a visual angle, that is, a phenomenon that switching between the signal line 5 and the common electrode 7 is observed depending on an angle (viewing angle) relative to the liquid crystal panel (refer to an arrow in FIG. 7), heretofore, a black matrix 10 covering the signal line 5 has been required to be widened. However, such widening of the black matrix also has resulted in lowering of the aperture ratio, and in addition, has required a high accuracy in aligning the glass substrates 1 and 2.

Particularly, accompanied with higher definition of a liquid crystal panel in recent years, each pixel region has been reduced. For this reason, when improvement of the aperture ratio is hindered due to various reasons as described above, achievement of the higher definition of the liquid crystal panel is also hindered.

Figure 9:
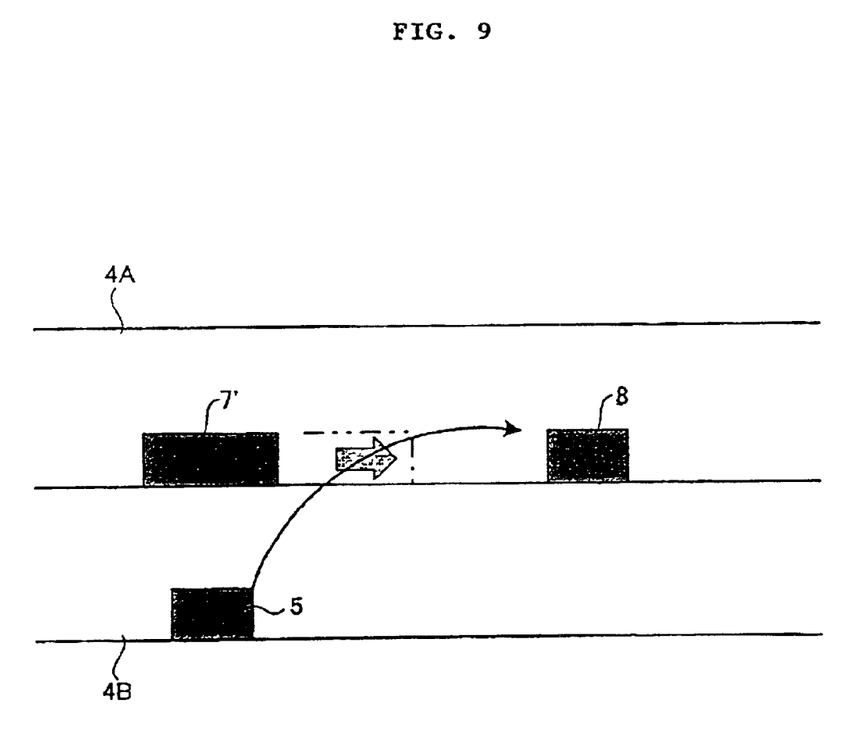
FIG. 9 is a cross-sectional view showing a structure in the case where a signal line and a common electrode are overlapped with each other.

The inventor of the present invention has found out a method shown in FIG. 9, in which a common electrode 7' is arranged immediately above a signal line 5. If such a construction is adopted, an electric field from the signal line 5 acts on the closest common electrode 7' immediately above the signal line 5. Therefore, a shield effect is exerted by the common electrode 7', and a pixel electrode 8 is hardly influenced by the electric field. However, the width of the common electrode 7' is required to be widened as shown by a chain and dotted line in FIG. 9 in order to secure the shield effect by the common electrode 7'. Consequently, the aperture ratio is lowered. From the above, this method was not deemed as effective solving means for the problems.

SUMMARY OF THE INVENTION

The present invention was made with the foregoing technical problems in mind.

The object of the present invention is to provide a display panel for a display device, and a display device, which are capable of increasing the aperture ratio of the pixel region.

A feature of the present invention includes a display panel having common electrodes arranged above gate lines and signal lines with an insulating layer interposed therebetween; and pixel electrodes, each being arranged in an intermediate position between two common electrodes adjacent to each other, in which the pixel electrodes are provided with first electrodes arranged in the same layer as the common electrodes and second electrodes arranged in the same layer as the signal lines.

Another feature of the present invention includes a display panel having common electrodes arranged above gate lines and signal lines with an insulating layer interposed therebetween, and pixel electrodes composed of first and second electrodes arranged with an insulating layer interposed therebetween.

Yet another feature of the present invention is characterized in that a display panel includes common electrodes covering signal lines and gate lines, pixel electrodes, and shield portions for shielding electric fields from the signal lines.

Various other objects, features, and attendant advantages of the present invention will become more fully appreciated as the same becomes better understood when considered in conjunction with the accompanying drawings, in which like reference characters designate the same or similar parts throughout the several views.

BRIEF DESCRIPTION OF DRAWINGS

For a more complete understanding of the present invention and the advantages thereof, reference is now made to the following description taken in conjunction with the accompanying drawings.

DETAILED DESCRIPTION

Hereinbelow, the present invention will be described in detail based on an embodiment shown in the accompanying drawings.

In accordance with a feature of the present invention, electric fields in a direction along the substrate surface are generated between the common electrodes and the first electrodes of the pixel electrodes, which are located in the same layer, and the liquid crystal is driven by the electric fields. In this case, the electric fields from the signal lines are received by the second electrodes of the pixel electrodes located in the same layer as the signal lines, and thus the shield effect is exerted for the electric fields between the common electrodes and the first electrodes. Moreover, if the first and second electrodes of the pixel electrodes are provided in positions where they are overlapped with each other with the insulating layer interposed therebetween, the second electrodes located in the same layer as the signal lines are consequently closer to the signal electrodes than the first electrodes, and thus the shield effect is securely exerted.

Furthermore, if the common electrodes and the signal lines are arranged in an overlapped manner in the thickness direction of the display panel, lowering of the aperture ratio can be further suppressed. In addition, the majority of the electric fields from the signal lines act on the common electrodes. Therefore, the shield effect for the electric fields between the common electrodes and the first electrodes is further increased.

The pixel electrodes and the common electrodes are not necessarily located in the same layer. Moreover, each of the common electrodes is located at both sides of the pixel region, and the pixel electrode is not always located in an intermediate position between the both sides. For example, the present invention can be also applied to the case where the common electrodes are respectively provided at the both sides and the intermediate portion of the pixel region, and the pixel electrode is provided between the common electrodes adjacent to each other.

Furthermore, the present invention can be grasped as a display panel comprising shield electrodes provided in positions closer to the signal lines than the pixel electrodes, the foregoing shield electrodes being set at potentials electrically equal to those of the pixel electrodes. Thus, the electric fields from the signal lines can be shielded from extending to the pixel electrodes by the shield electrodes.

Here, each common electrode and each pixel electrode can be formed to be bent in order to divide an alignment direction of an optical display element into at least two directions in each pixel region. In this case, preferably, the pixel electrode is provided with a storage capacitor on a line where bent portions of the common electrodes at both sides of the pixel electrodes are mutually linked. Moreover, in each pixel region, a storage capacitor line for storing a potential supplied to the switching element is preferably provided in a portion where the alignment direction of the optical display element is switched.

The portion where the common electrode is bent is originally a region where the alignment of the optical display element is switched. If the storage capacitor for the pixel electrode and the storage capacitor line for the switching element are arranged in the above-described portion, lowering of the aperture ratio in the pixel region can be suppressed.

Moreover, the pixel electrodes and the shield portions are preferably arranged in an overlapped manner in a thickness direction of the display panel. In addition, preferably, the pixel electrodes and the shield portions are arranged with an insulating layer having a predetermined thickness interposed therebetween, the foregoing pixel electrodes and the foregoing shield portions being arranged on one and the other surfaces of the insulating layer. And preferably, the foregoing signal lines are arranged in the same layer as the shield portions.

Here, as an insulating layer, for example, the same material as that of transparent resist capable of securing a thickness of several micrometers can be suitably used.

Figure 1:
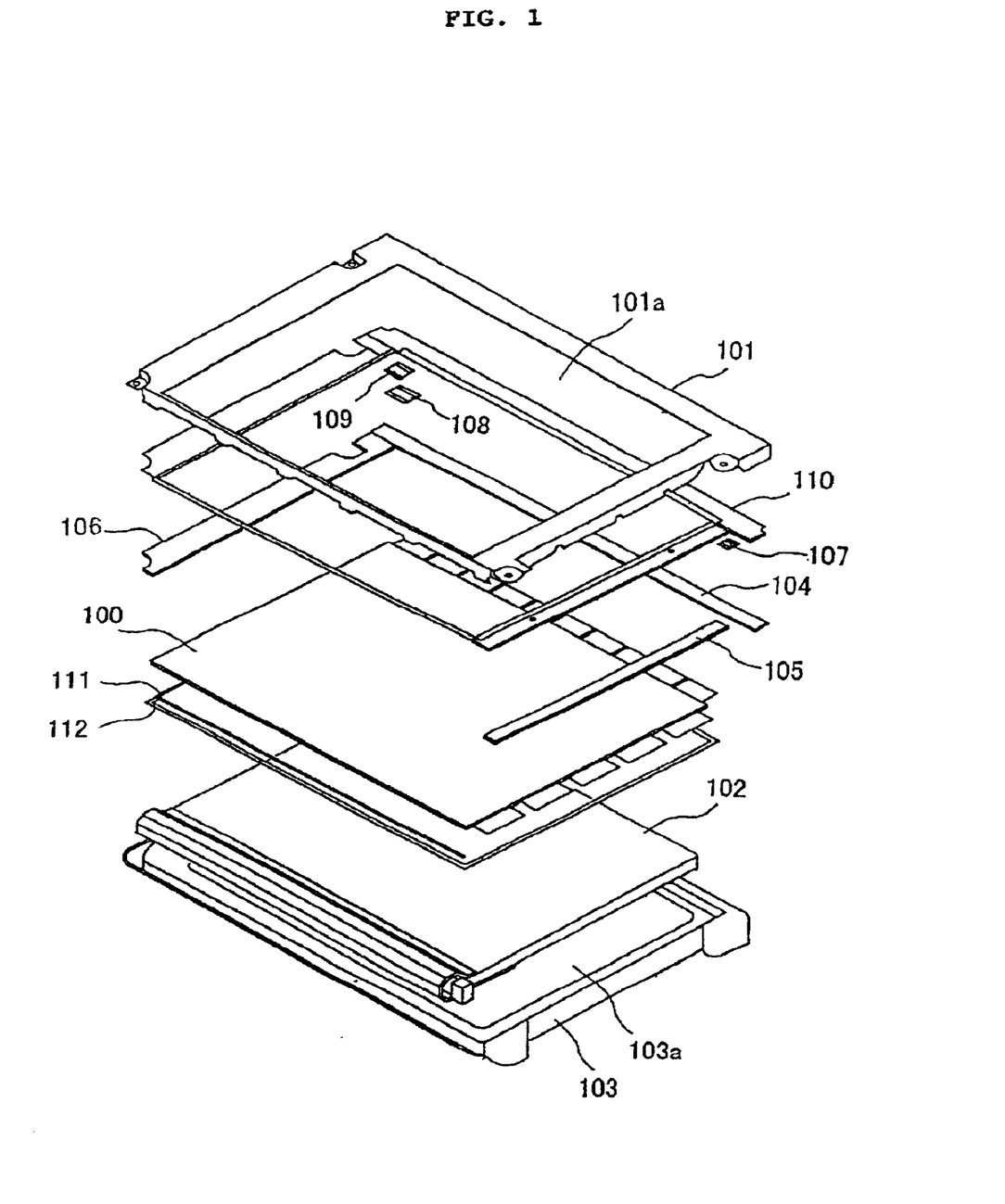
FIG. 1 is a view showing the construction of a display device according to an embodiment of the present invention.

FIG. 1 is a perspective view explaining an entire construction of a display device according to an embodiment of the present invention. The display device comprises: a liquid crystal panel 100 as a display panel; a metal-made shield case 101 forming an upper frame and having a display window 101a for defining an effective screen of the liquid crystal panel 100; a backlight unit 102 irradiating the liquid crystal panel 100 with planar light; and a lower case 103 provided below the backlight unit 102 and having an aperture 103a.

On the liquid crystal panel 100, a drain circuit substrate 104, a gate circuit substrate 105 and an interface circuit substrate 106 are formed. These circuit substrates are provided with joiners 107, 108 and 109 for making connection thereamong. These circuit substrates 104, 105 and 106 are fixed to the shield case 101 with an insulating sheet 110 interposed therebetween.

Meanwhile, under the liquid crystal panel 100, a light shielding spacer 112 is provided with a rubber cushion 111 interposed therebetween.

FIGS. 2A to 4 are views explaining the liquid crystal panel 100 in this embodiment.

Figure 2:
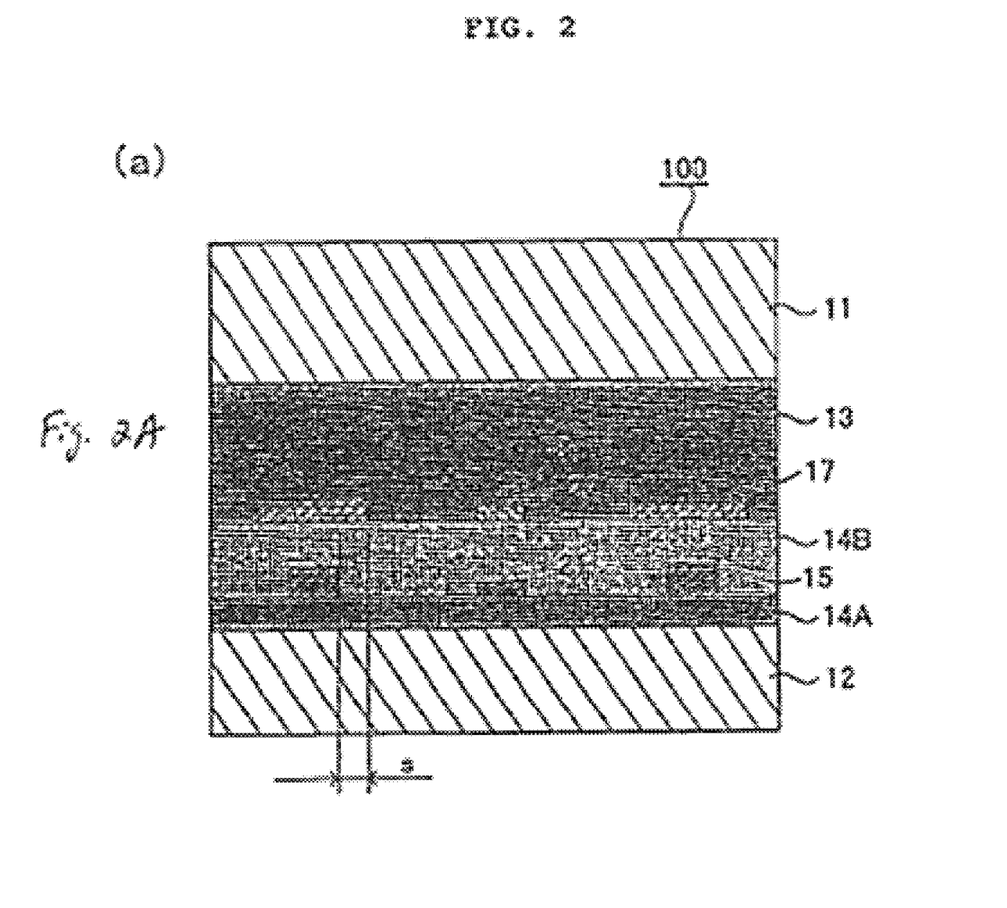
FIG. 2A is a cross-sectional view of FIG. 3, taken along a line A–A'.
FIG. 2B is a cross-sectional view of FIG. 3, taken along a line B–B'.
Figure 2B:
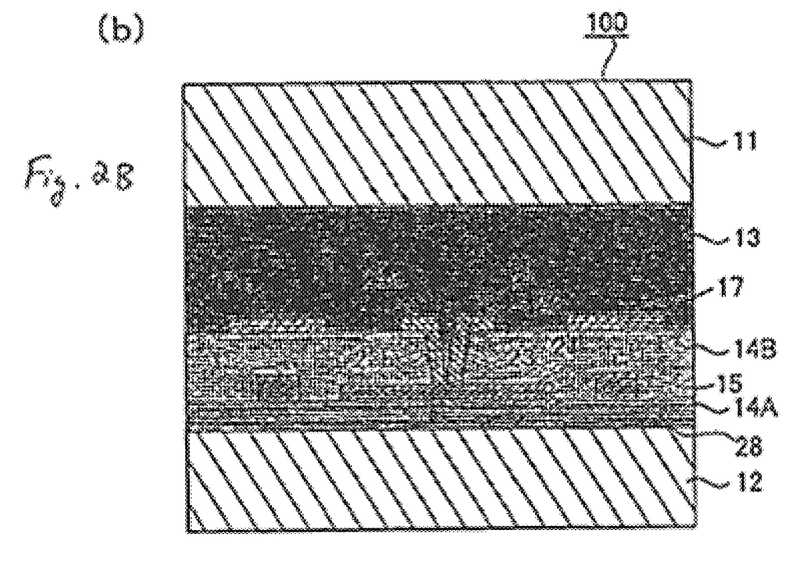

As shown in FIGS. 2A and 2B, the liquid crystal panel 100 is made in such a manner that glass substrates (substrates) 11 and 12 are opposed to each other with a predetermined gap therebetween and are adhered by interposing sealant (not shown) provided on an outer peripheral portion thereof, and liquid crystal is filled between the glass substrates 11 and 12 to form a liquid crystal layer 13. Here, the thickness of the liquid crystal layer 13 is set at, for example, 4 to 5 micrometers.

The glass substrate 11 is provided with a color filter (not shown) for dividing the light irradiated from the backlight into the three colors of Red (R), Green (G) and Blue (R).

On the surface of the glass substrate 12, insulating layers 14A and 14B are formed. Here, for the insulating layer 14B, the same material as that of transparent resist capable of securing a large film thickness (several micrometers) that is about ten times larger than a conventionally used nitride film or the like (film thickness: less than 1 micrometer), for example, acrylic resin or the like is used. In this embodiment, for example, the thickness of the insulating layer 14B is set at 2 to 4 micrometers, and a relative dielectric constant thereof is set at about 3.5.

Figure 3:
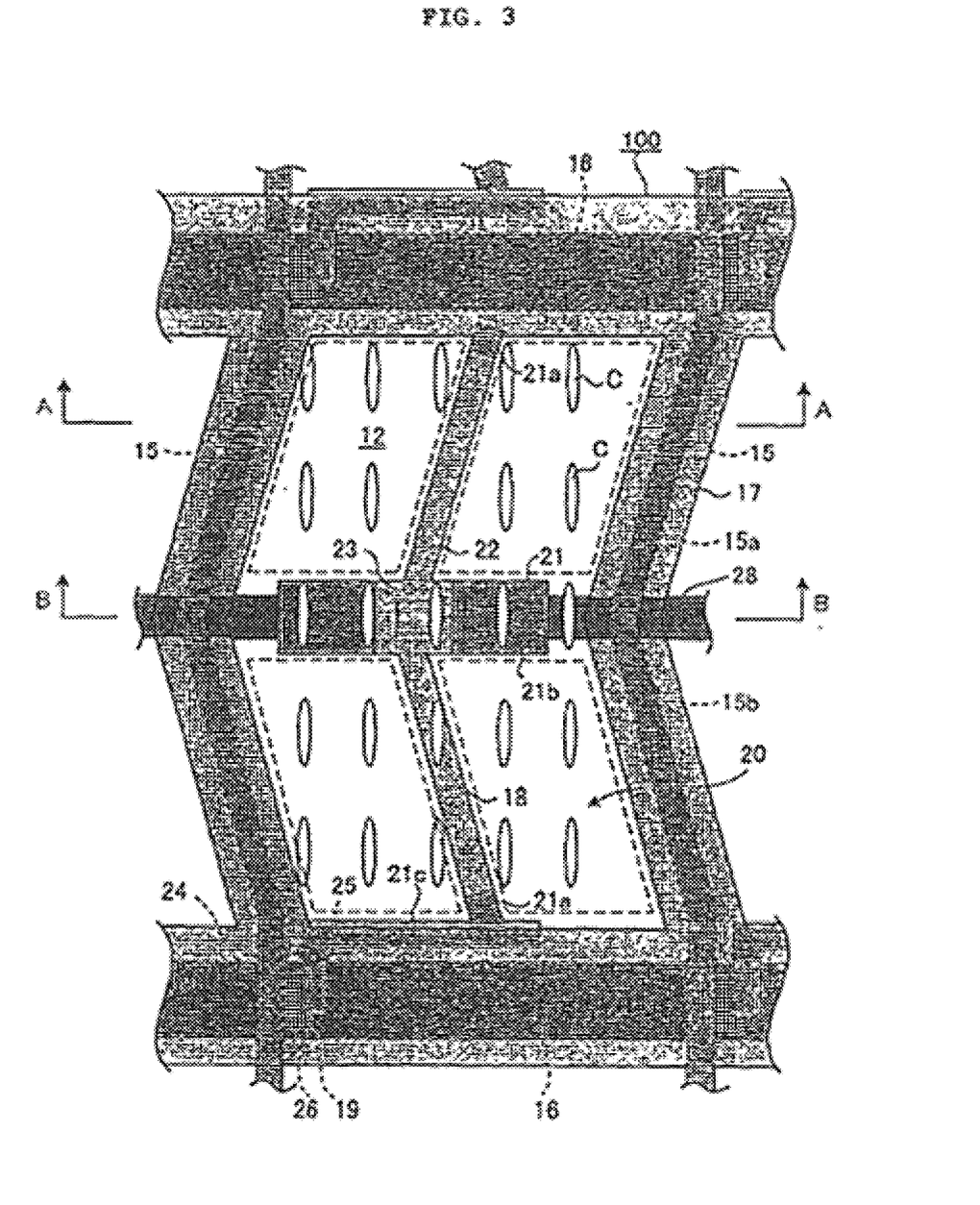
FIG. 3 is a plan view showing a wiring structure of the display panel according to an embodiment of the present invention.

As shown in FIG. 3, the glass substrate 12 is provided with thin film transistors (TFT) 19 having signal lines 15, gate lines 16, common electrodes 17, pixel electrodes 18, an amorphous silicon layer and the like deposited thereon.

Each signal line 15 is the one for transmitting a display signal to the TFT 19, arranged on the insulating layer 14A, and provided to be extended in a predetermined direction at each predetermined interval. Each gate line 16 is the one for transmitting a scanning signal to the TFT 19, arranged on the glass substrate 12, and provided so as to be extended in a direction approximately perpendicular to that where each signal line 15 continues at each predetermined interval. In such a manner, the signal lines 15 and the gate lines 16 are arranged in a matrix type. A pixel region 20 is defined by being surrounded by two signal lines 15 adjacent to each other and two gate lines 16 adjacent to each other.

In this embodiment, the signal line 15 is bent in an "L" shape so as to be divided into an upper portion 15a and a lower portion 15b for each pixel region 20. This bending is made for changing directions of electric fields in upper and lower halves of the pixel region 20 to change twisting directions of the liquid crystal when driven, thus preventing gradation inversion (phenomenon such that a display color looks whitish and a white color looks shifted to yellow or blue) when viewing the display screen from a particular direction.

The common electrodes 17 are provided on the insulating layer 14B, and are formed in an approximately lattice fashion so as to be located immediately above the respective signal lines 15 and the gate lines 16. It should be noted that each common electrode 17 is bent in the "L" shape above the signal line 15 similarly to the same. Note that the common electrode 17 is set to have width wider than those of the signal line 15 and the gate line 16.

Figure 4:
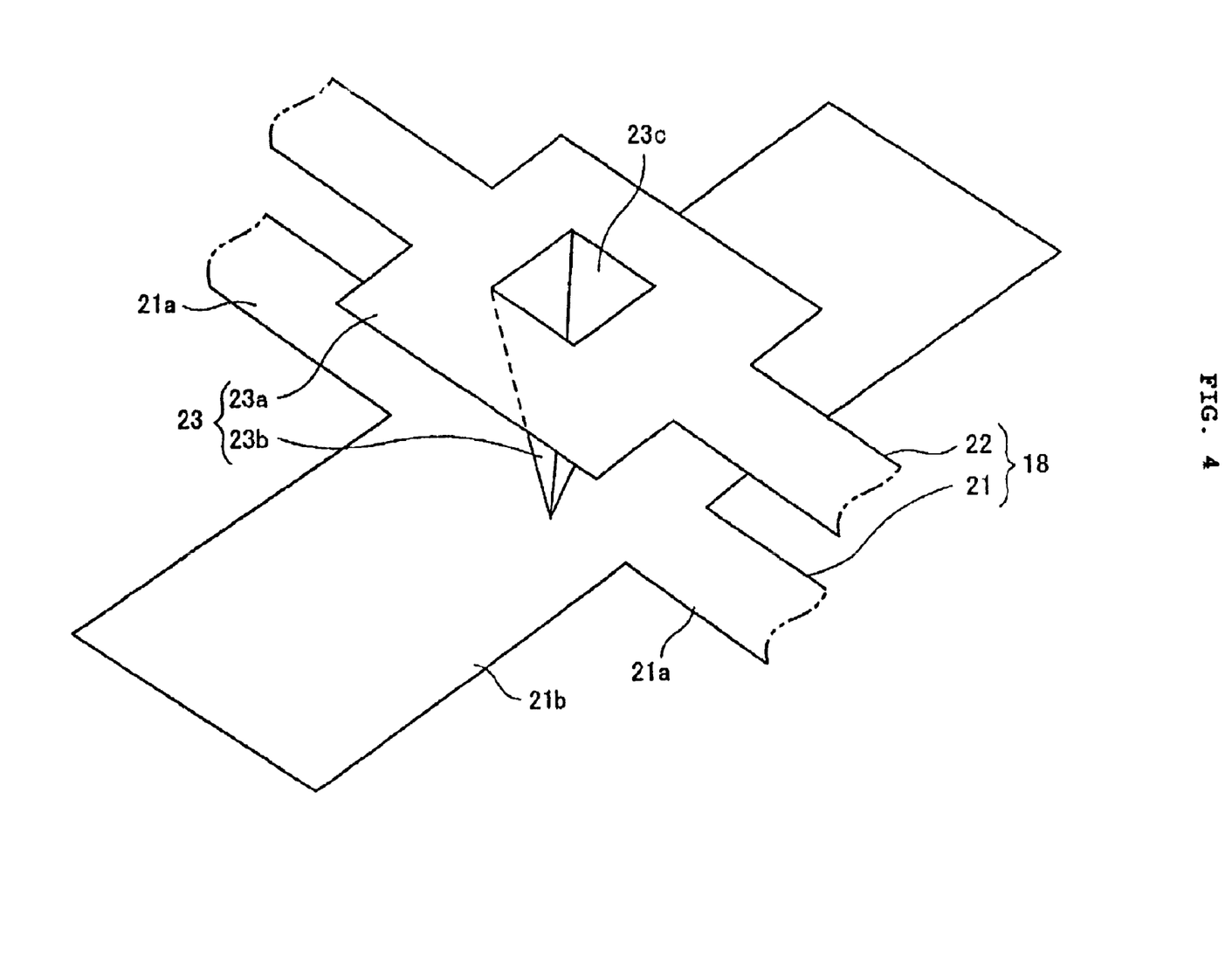
FIG. 4 is a perspective view showing a part of a pixel electrode of the display panel according to an embodiment of the present invention.

As shown in FIGS. 3 and 4, the pixel electrode 18 has a two-layer structure of a lower pixel electrode (second electrode, shield electrode, shield portion) 21 on the insulating layer 14A and an upper pixel electrode (first electrode, shield electrode, shield portion) 22 on the insulating layer 14B. The lower pixel electrode 21 takes an approximately cross shape as vertically viewed, and is formed of an electrode portion 21a and a storage capacitor 21b. The electrode portion 21a is located intermediately between the two signal lines 15 provided on the same layer, extended approximately parallelly to the signal lines 15, and formed in the "L" shape. Moreover, the electrode portion 21a is provided over the approximately full length of the pixel region 20. The storage capacitor 21b is extended out of an intermediate portion in a lengthwise direction of the electrode portion 21a to both sides thereof, and extended in a direction approximately perpendicular to the electrode portion 21a, that is, in a direction parallel to the gate line 16. Moreover, on a lower end portion of the storage capacitor 21b, a storage capacitor 21c extended parallelly to the gate line 16 toward the TFT 19 is integrally formed.

The upper pixel electrode 22 is located intermediately between the both-side common electrodes 17 provided on the same layer, formed in the "L" shape, and located in a position where it is overlapped with the electrode portion 21a of the lower pixel electrode 21 in the thickness direction of the liquid crystal panel 100, that is, in a position immediately thereabove. On a central portion of the upper pixel electrode 22, a joint portion 23 for connecting the same to the lower pixel electrode 21 is formed. As shown in FIG. 4, the joint portion 23 is formed of: a plate 23a constituting a part of the upper pixel electrode 22; and a joiner 23b extended downward from the plate 23a so that an appearance thereof can be, for example, an approximately quadrangular frustum shape (of which the tip portion is preferably not sharp), in which the tip portion is electrically connected to the storage capacitor 21b of the lower pixel electrode 21. On a central portion of the plate 23a, a concave portion 23c is formed by forming the joiner 23b. As shown in FIG. 2B, the joint portion 23 penetrates the insulating layer 14B, and electrically connects the lower pixel electrode 21 and the upper pixel electrode 22.

As shown in FIG. 3, the TFT 19 is a switching element for controlling a drive voltage to the pixel electrode 18, and is provided on an intersection portion of the signal line 15 and the gate line 16. On the insulating layer 14A covering the gate line 16 (refer to FIGS. 2A and 2B), the TFT 19 comprises: a drain electrode 24 for diverting a part of the signal line 15; a source electrode 25 extended from the storage capacitor 21c of the lower pixel electrode 21 to the gate line 16; and an amorphous silicon (a-Si) thin film portion 26 interposed between the drain electrode 24 and the source electrode 25.

Moreover, on the glass substrate 12, a storage capacitor line 28 extended parallelly to the gate line 16 is provided. The storage capacitor line 28 is electrically connected to each common electrode 17 in the outer peripheral portion and the like of the liquid crystal panel 100, and has a potential equal to that of the common electrode 17, thus holding the voltage in the TFT 19 and the like. Here, the storage capacitor line 28 is arranged so as to cross the central portion in the vertical direction of each pixel region 20, that is, in the "L" shaped bent portion of the signal line 15, at which the signal line 15 is divided into the upper and lover portions 15a and 15b. Above the storage capacitor line 28, the storage capacitor 21b of the foregoing lower pixel electrode 21 and the joint portion 23b are arranged in an overlapped manner.

Figure 5:
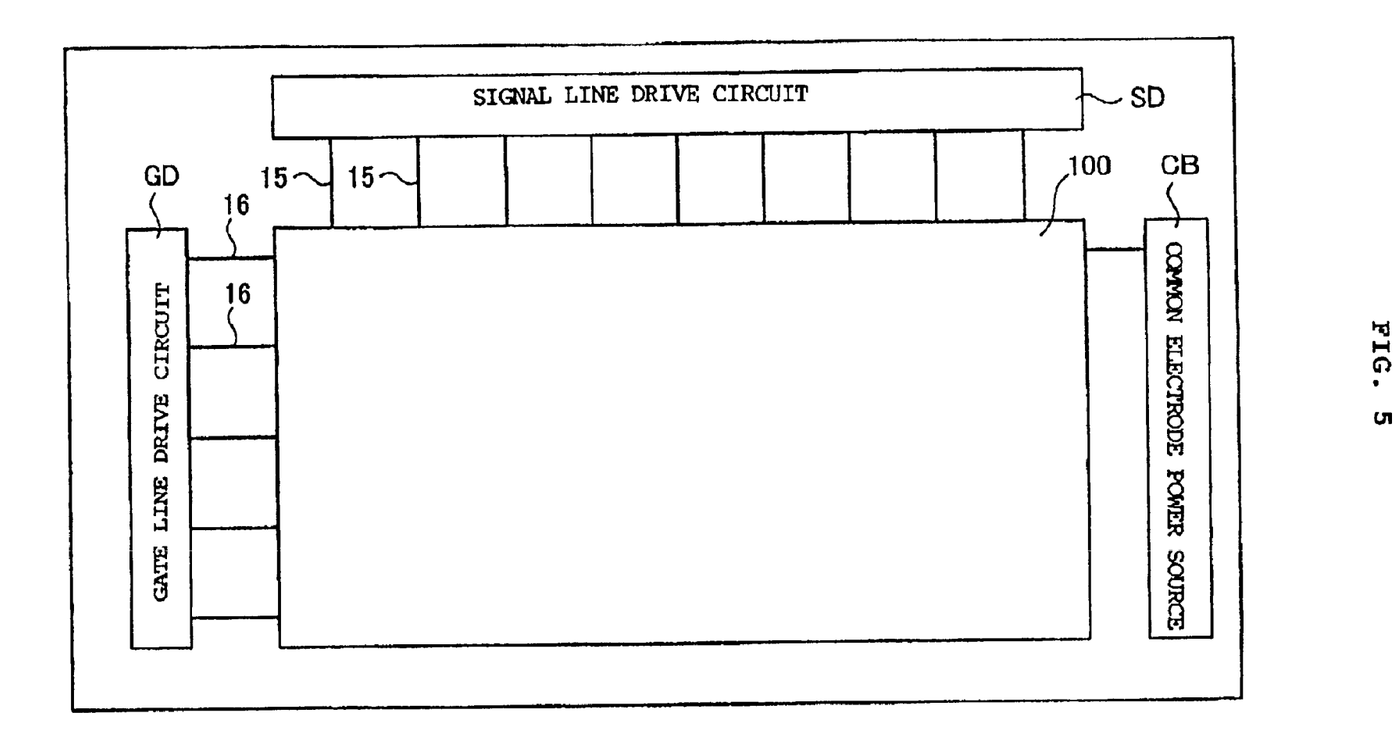
FIG. 5 is a view showing a drive structure of the display panel according to an embodiment of the present invention.

FIG. 5 shows the construction of a drive circuit of the liquid crystal panel 100. The liquid crystal panel 100 comprises: a signal line drive circuit SD for supplying display signals to the pixel electrodes 18 (refer to FIG. 3) via the signal lines 15, that is, for applying voltages thereto; a gate line drive circuit GD for supplying scanning signals for controlling on/off of the TFTs 19 (refer to FIG. 3) via the gate lines 16; and a common electrode power source CB for supplying voltages to the common electrodes 17 (refer to FIG. 3).

With regard to the liquid crystal panel 100, in each pixel region 20, a drive voltage is applied to the pixel electrode 18 by the operation of the TFT 19, a transverse electric field is generated between the common electrode 17 and the pixel electrode 18, the liquid crystal is driven by in plane switching, and thus a desired display is performed. FIG. 3 shows an initial alignment direction of (p type) liquid crystal molecules C. In this case, electric fields are generated between the common electrode 17 and the lower pixel electrode 21. The pixel electrode 18 is located between the common electrode 17 and the upper pixel electrode 22 which was constructed with the pixel electrode 18. The liquid crystal is driven by the electric field generated between the common electrode 17 and the upper pixel electrode 22 located in the same layer as the common electrode 17.

Moreover, since the common electrode 17 is located immediately above the signal line 15 and the gate line 16, the electric fields from the signal line 15 and the gate line 16 act mainly on the closest common electrode 17 immediately thereabove. Thus, the electric fields from the signal line 15 and the gate line 16 become hard to act on the pixel electrode 18. Hence, it can be said that the common electrode 17 exerts a shield effect. In addition, reduction in the aperture size can be suppressed as much as possible by disposing the common electrode 17 immediately above the signal line 15 and the gate line 16.

Furthermore, though the electric field from the signal line 15 mainly act on the common electrode 17 as described above, it is conceived that a part of the electric field also acts on the pixel electrode 18. However, since the electrode portion 21a of the lower pixel electrode 21 located in the same layer as the signal line 15 is closer to the signal line 15 than the upper pixel electrode 22 in distance, the electric field from the signal line 15 to the pixel electrode 18 acts on the electrode portion 21a of the lower pixel electrode 21. Thus, the influence of the electric field from the signal line 15 on the upper pixel electrode 22 can be suppressed. Thus, the electrode portion 21a of the lower pixel electrode 21 exerts the shield effect. In this case, since the electrode portion 21a is provided over the approximately full length of the pixel region 20, the shield effect is exerted on the full pixel region 20. As a result, the adverse effect on the drive of the liquid crystal is suppressed, occurrence of the crosstalk is prevented, and thus the display quality on the display device can be improved.

Here, if it is assumed that there exists no shield effect by the electrode portion 21 of the lower pixel electrode 21, only the common electrode 17 located immediately above the signal line 15 will bear the shield effect from the signal line 15 to the electric field. Suppose that equivalent display quality is to be obtained between the above-described case and the case in this embodiment, in which the shield effect by the electrode portion 21a of the lower pixel electrode 21 exists. In this condition, the width of the common electrode 17 can be narrowed more in the case where the common electrode 17 and the electrode portion 21a of the lower pixel electrode 21 bear the shield effect than in the case where only the common electrode 17 bears the shield effect. Consequently, the aperture ratio in the pixel region 20 can be increased, and thus higher definition of the liquid crystal panel 100 and facilitation of aligning the glass substrates 11 and 12 can be achieved.

As a matter of course, in comparison with the case of FIG. 7 described as the conventional technology, the aperture ratio can be increased to a great extent. More specifically, in the case where the width of, for example, 10 micrometers (dimension w in FIG. 7) is required as a width of the common electrode 7 shown in FIG. 7, if the equivalent display quality is to be obtained, a dimension protruding from the signal line 15 to the inside of the pixel region 20 (dimension s in FIG. 2A) may be set in a range of 3 to 5 micrometers in the liquid crystal panel 100 in this embodiment shown in FIGS. 2A and 2B.

Figure 6:
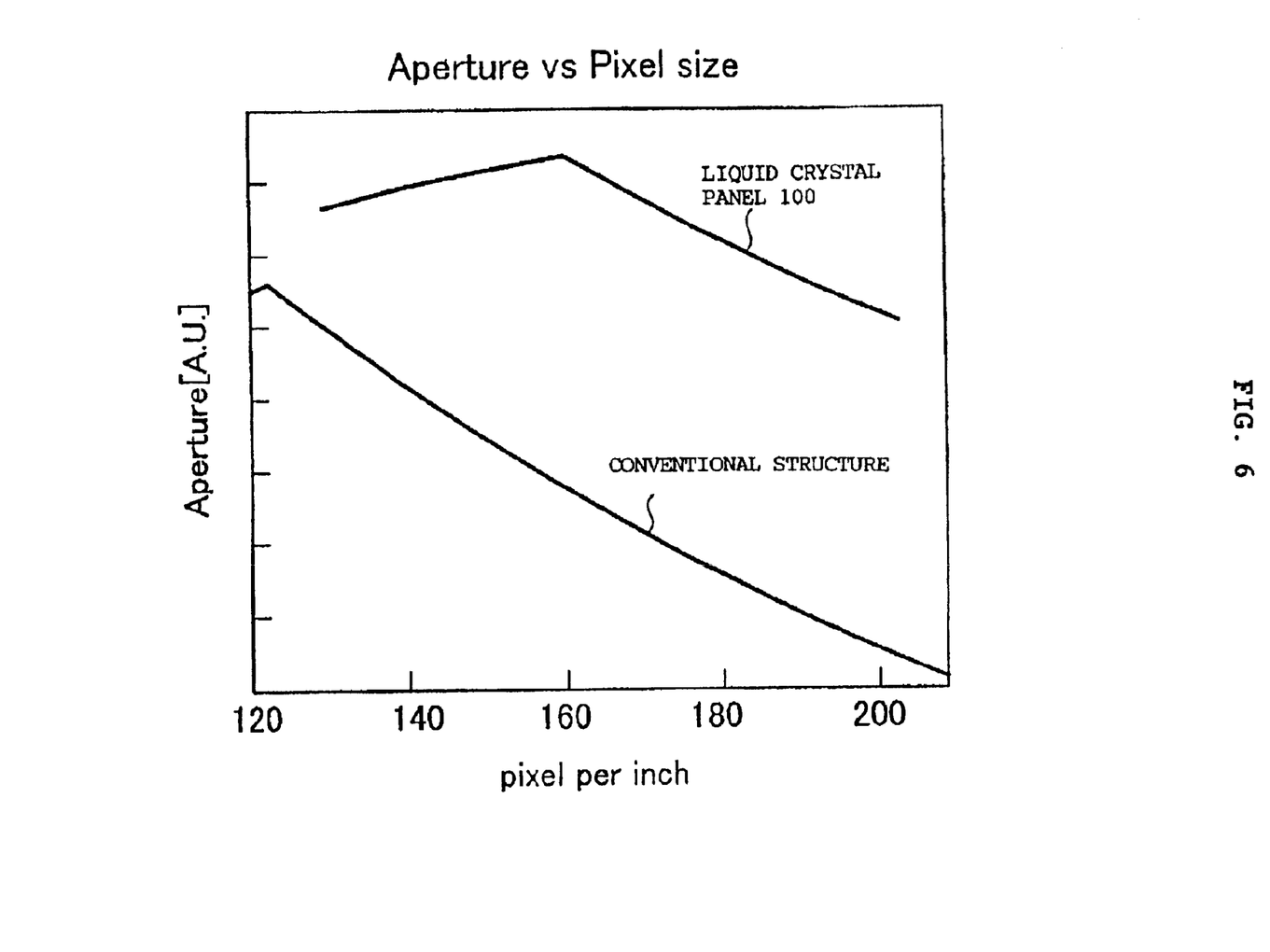
FIG. 6 is a graphic representation showing a comparison of an aperture ratio between a conventional structure of a liquid crystal panel and a structure of a liquid crystal panel according to an embodiment of the present invention.

FIG. 6 shows a comparison of the aperture ratios securable for the pixel size between the construction of the conventional liquid crystal panel (refer to FIGS. 7 and 8) and the construction of the liquid crystal panel 100 according to an embodiment of the present invention. Here, portions sloping down to the left in the respective curves are caused by restrictions of the drive voltage. As apparent also from this graph, effectiveness of the present invention becomes more significant as the size of the pixel becomes smaller.

Moreover, as described above, thanks to the shield effect of the common electrode 17, crosstalk can be prevented to obtain a secured light shielding effect. Therefore, in the case where the liquid crystal panel 100 is of a normally black type, there is no necessity of providing a black matrix on portions except the portions of the TFTs 19 and the like. (Incidentally, in the case where the liquid crystal panel 100 is of a normally white type, if "black" is to be displayed, the portion of the common electrode 17 turns "white", thus requiring the black matrix.) In the above-described manner, simplification of the manufacturing process can be achieved, and lowering of the aperture ratio due to misalignment of the glass substrates 11 and 12 can be avoided.

Incidentally, in this embodiment, the signal line 15 is bent in the "L" shape so as to be divided into the upper and lower portions 15a and 15b for each pixel region 20, and the twisting directions (alignment directions) of the liquid crystal are made to differ in the upper half and lower half of each pixel region 20. In this case, in the portion where the twisting directions of the liquid crystal are divided (boundary portion between the upper and lower halves of the pixel region 20), there is a property that behavior of the liquid crystal becomes unstable. In this embodiment, the storage capacitor 21b of the lower pixel electrode 21, the joint portion 23, the storage capacitor line 28 are arranged in the above-described portion. In the case where these are arranged in other portions, this results in the reduction in the aperture size. However, by arranging these in the portion where the behavior of the liquid crystal is originally unstable, lowering of the aperture ratio can be effectively suppressed.

Besides the above, in the event of realizing the structure of this embodiment, in which the insulating layer 14B is formed of a material capable of securing a larger film thickness, other than the conventionally used nitride film or the like, and the signal line 15 and the common electrode 17 are overlapped with each other, increase in electrical capacitance load between the signal line 15 and the common electrode 17 can be suppressed in comparison with the conventional insulating film with a thin film thickness. Thus, drive delay can be prevented even in a portion where the drive delay of the signal line 15 is prolonged, a sufficient voltage can be inputted to the pixel electrode 18, and thus uneven displaying can be avoided.

In the above-described embodiment, the signal line 15 is bent in the "L" shape. It should be noted, however, that the present invention is not limited to the above-described constitution, and that a similar effect to that of the above can be obtained even in the case where the signal line 15 is formed in a linear shape. In this case, as a matter of course, each of the common electrode 17 and the pixel electrode 18 is also formed in the linear shape.

Moreover, in the display device described in the above embodiment, the portions other than the liquid crystal panel 100 can be altered into any other embodiments.

Moreover, any materials can be adopted for the glass substrates 11 and 12, the signal line 15, the gate line 16, the common electrode 17, the pixel electrode 18 and the like, as far as they do not depart from the gist of the present invention.

As described above, according to the present invention, the aperture ratio of the pixel region can be increased.

Although the preferred embodiment of the present invention has been described in detail, it should be understood that various changes, substitutions and alternations can be made therein without departing from spirit and scope of the inventions as defined by the appended claims.

What is claimed is:

1. A display panel having liquid crystal filled between two substrates, comprising:
   gate lines and signal lines arrayed in a matrix type on one of said substrates;
   common electrodes arranged above said gate lines and said signal lines with an insulating layer interposed therebetween, said common electrodes being arranged immediately above said signal lines; and
   pixel electrodes for generating electric fields with said common electrodes,
   wherein each of said pixel electrodes is provided with a first electrode and a second electrode arranged above the first electrode with an insulating layer interposed therebetween, said first and second electrodes being electrically connected to each other.

2. A display panel having liquid crystal filled between two substrates, comprising:
   gate lines and signal lines arrayed in a matrix type on one of said substrates;
   common electrodes arranged above said gate lines and said signal lines with an insulating layer interposed therebetween, said common electrodes being arranged at both sides of a pixel region defined by said gate lines and said signal lines, said common electrodes being arranged immediately above said signal lines; and
   pixel electrodes, each being arranged in an intermediate position between two of said common electrodes adjacent to each other,
   wherein each of said pixel electrode is provided with first electrode arranged in the same layer as said common electrodes and second electrode arranged in the same layer as said signal lines, said second electrode being electrically connected to said first electrode.

3. The display panel according to claim 2, wherein said common electrodes overlap said signal lines in a thickness direction of said display panel.

4. The display panel according to claim 2, wherein said first electrode and said second electrode are provided in positions where said first electrode overlaps said second electrode with said insulating layer interposed therebetween.

5. The display panel according to claim 4, wherein said second electrodes are arranged so as to be extended over approximately a full length of said pixel region in a direction where said signal lines are extended.

6. The display panel according to claim 2, wherein said second electrode is connected to a switching element for controlling drive voltage to said pixel electrodes.

7. A display panel, comprising:
   pixel electrodes for applying drive voltages to optical display elements;
   common electrodes for generating electric fields in a direction along a substrate surface with said pixel electrodes;
   switching elements for controlling drive voltages to said pixel electrodes;
   gate lines for transmitting scanning signals to said switching elements;
   signal lines for transmitting display signals to said switching elements; and
   shield electrodes provided in positions closer to said signal lines than said pixel electrodes, said shield electrodes being set at potentials electrically equal to those of said pixel electrodes, said shield electrodes being in a different plane than said pixel electrodes.

8. The display panel according to claim 7, wherein said common electrodes are arranged closer to said signal lines than other electrodes.

9. The display panel according to claim 7, wherein each of said common electrodes and each of said pixel electrodes are formed to be bent in order to divide an alignment direction of the optical display element into at least two directions in a pixel region defined by said gate lines and said signal lines.

10. The display panel according to claim 9, wherein said pixel electrodes are provided with storage capacitors for storing potentials supplied to said pixel electrodes on lines where bent portions of said common electrodes at both sides of said pixel electrodes are mutually linked.

11. The display panel according to claim 9, wherein, in each pixel region, a storage capacitor line for storing a potential supplied to said switching element is provided in a portion where the alignment direction of the optical display element is switched.

12. A display device, comprising:
   a display panel in which an optical display element is arranged between two substrates; and
   a drive circuit for driving said display panel,
   wherein said display panel comprises:
      a plurality of pixel regions defined by signal lines and gate lines arrayed in a matrix type;
      common electrodes arranged on outer peripheral portions of said pixel regions, said common electrodes covering said signal lines and said gate lines;
      pixel electrodes for generating electric fields in a direction along surfaces of said substrates with said common electrodes in order to drive the optical display element; and shield portions for shielding electric fields from said signal lines, and said drive circuit comprises:

a signal line drive circuit for supplying display signals to said pixel electrodes via said signal lines; and a gate line drive circuit for supplying scanning signals via said gate lines in order to control drive voltages to said pixel electrodes.

13. The display device according to claim 12, wherein said pixel electrodes overlap said shield portions in a thickness direction of said display panel.

14. The display device according to claim 13, wherein said pixel electrodes and said shield portions are arranged with an insulating layer having a predetermined thickness interposed therebetween, said pixel electrodes and said shield portions being arranged on one and the other surfaces of the insulating layer, and said signal lines are arranged in the same layer as said shield portions.

15. A display panel having liquid crystal filled between two substrates, comprising:

gate lines and signal lines arrayed in a matrix type on one of said substrates;

common electrodes arranged above said gate lines and said signal lines with an insulating layer interposed therebetween, said common electrodes being arranged immediately above said gate lines; and pixel electrodes for generating electric fields with said common electrodes, wherein each of said pixel electrodes is provided with a first electrode and a second electrode arranged above the first electrode with an insulating layer interposed therebetween, said first and second electrodes being electrically connected to each other.

16. A display panel having liquid crystal filled between two substrates, comprising:

gate lines and signal lines arrayed in a matrix type on one of said substrates;

common electrodes arranged above said gate lines and said signal lines with an insulating layer interposed therebetween, said common electrodes being arranged at both sides of a pixel region defined by said gate lines and said signal lines, said common electrodes being arranged immediately above said gate lines; and pixel electrodes, each being arranged in an intermediate position between two of said common electrodes adjacent to each other, wherein each of said pixel electrode is provided with first electrode arranged in the same layer as said common electrodes and second electrode arranged in the same layer as said signal lines, said second electrode being electrically connected to said first electrode.

17. The display panel according to claim 7, wherein said shield electrodes are in the same plane as said signal lines.

18. The display panel according to claim 16, wherein said first electrode and said second electrode are provided in positions where said first electrode overlaps said second electrode with said insulating layer interposed therebetween.

19. The display panel according to claim 18, wherein said second electrodes are arranged so as to be extended over approximately a full length of said pixel region in a direction where said signal lines are extended.

20. The display panel according to claim 16, wherein said second electrode is connected to a switching element for controlling drive voltage to said pixel electrodes.

* * * * *